United States Patent
Fang et al.

(10) Patent No.: US 11,520,437 B2
(45) Date of Patent: Dec. 6, 2022

(54) TOUCH DEVICE HAVING SWITCH CIRCUITS CONTROLLING BETWEEN TOUCH ELECTRODES AND DRIVE CHIP, TOUCH SYSTEM AND CONTROL METHOD THEREOF

(71) Applicants: Hefei BOE Optoelectronics Technology Co., Ltd., Hefei (CN); BOE Technology Group Co., Ltd., Beijing (CN)

(72) Inventors: Zhixiang Fang, Beijing (CN); Guanglei Yang, Beijing (CN)

(73) Assignees: Hefei BOE Optoelectronics Technology Co., Ltd., Anhui (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/258,153

(22) PCT Filed: Mar. 31, 2020

(86) PCT No.: PCT/CN2020/082496
§ 371 (c)(1),
(2) Date: Jan. 5, 2021

(87) PCT Pub. No.: WO2021/195984
PCT Pub. Date: Oct. 7, 2021

(65) Prior Publication Data
US 2022/0137784 A1     May 5, 2022

(51) Int. Cl.
*G06F 3/041*   (2006.01)
*G06F 3/044*   (2006.01)

(52) U.S. Cl.
CPC ........ *G06F 3/04186* (2019.05); *G06F 3/0441* (2019.05); *G06F 3/0446* (2019.05); *G06F 3/04164* (2019.05); *G06F 3/04162* (2019.05)

(58) Field of Classification Search
None
See application file for complete search history.

(56) References Cited

U.S. PATENT DOCUMENTS 10,739,909 B1 *   8/2020   Lin ................... G09G 5/003
11,231,815 B2 *   1/2022   Munemoto ......... G06F 3/03545
(Continued)

FOREIGN PATENT DOCUMENTS

| CN | 102722274 A | 10/2012 |
|----|-------------|---------|
| CN | 103577008 A | 2/2014  |
| CN | 107066136 A | 8/2017  |

*Primary Examiner* — Chad M Dicke
(74) *Attorney, Agent, or Firm* — IPRO, PLLC (57) ABSTRACT

Embodiments of this disclosure provide a touch device, a touch system and a control method thereof. The touch device includes: a touch screen including: a plurality of touch electrodes, and a plurality of switch circuits corresponding to the plurality of touch electrodes respectively; and a drive chip bound and connected with the touch screen. The touch electrodes are coupled to the drive chip through the corresponding switch circuits. The drive chip is configured to: determine that the touch screen is contacted by an interference object and determine an interference area, according to capacitance values of the touch electrodes during a time period when a stylus is interacting with the touch screen, and disconnect touch electrodes in the interference area from the drive chip through corresponding switch circuits.

8 Claims, 9 Drawing Sheets

(56) References Cited

U.S. PATENT DOCUMENTS

| | | | |
|---|---|---|---|
| 2010/0117986 A1* | 5/2010 | Yang | G06F 3/04182 |
| | | | 345/174 |
| 2012/0182259 A1* | 7/2012 | Han | G06F 3/0418 |
| | | | 345/174 |
| 2013/0300672 A1 | 11/2013 | Griffin | |
| 2014/0043284 A1 | 2/2014 | Park et al. | |
| 2016/0266673 A1* | 9/2016 | Dinu | G06F 3/0442 |
| 2017/0177145 A1 | 6/2017 | Hara et al. | |

* cited by examiner

Tip of stylus and contacted
electrode form coupling capacitance C1

TOUCH DEVICE HAVING SWITCH CIRCUITS CONTROLLING BETWEEN TOUCH ELECTRODES AND DRIVE CHIP, TOUCH SYSTEM AND CONTROL METHOD THEREOF

CROSS REFERENCE TO RELATED DOCUMENTS

The present application is a national phase entry under 35 U.S.C. § 371 of International Application No. PCT/CN2020/082496, filed on Mar. 31, 2020.

FIELD

This disclosure relates to the field of touch display technology, and in particular to a touch device, a touch system and a control method thereof.

BACKGROUND

With the development of touch technology, more and more display screens have human-computer interaction functions. For example, a stylus can be used for the human-computer interaction.

Figure 1:
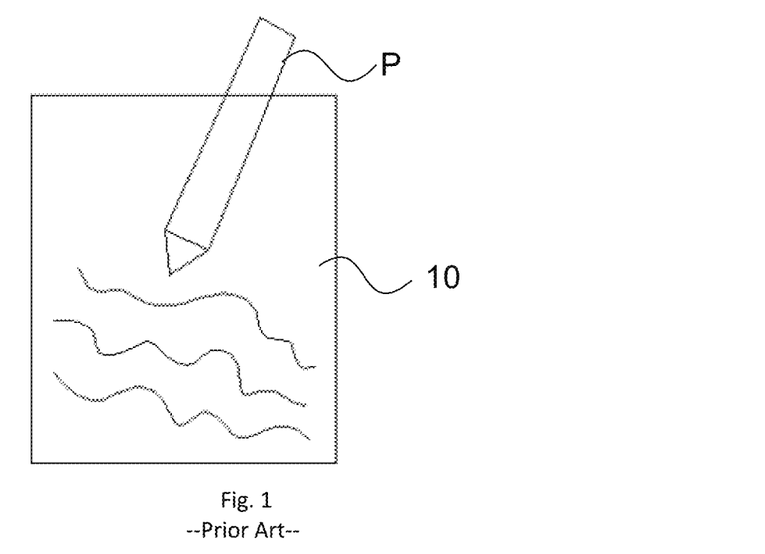
FIG. 1 is a schematic diagram when a user holds a stylus with one hand to write on the touch screen.

As shown in FIG. 1, when a user holds a stylus P with one hand to write on a touch screen 10, the lineation is relatively smooth and there is no broken line. But, under the large-area pressing (Palm) state in which one hand holds the stylus P to write on the touch screen 10 and the other hand H presses on the touch screen 10, broken lines will appear in the center area of the lineation, and broken lines will also appear at the edge of the touch screen 10. For example, in FIG. 2, broken lines appear in the areas A1 and A2, and even the phenomenon that the lines cannot be drawn occurs.

BRIEF SUMMARY

Embodiments of the disclosure provide a touch device, including:

a touch screen including: a plurality of touch electrodes, and a plurality of switch circuits corresponding to the plurality of touch electrodes respectively; and a drive chip bound and connected with the touch screen.

The touch electrodes are coupled to the drive chip through the corresponding switch circuits.

The drive chip is configured to determine that the touch screen is contacted by an interference object and determine an interference area, according to capacitance values of the touch electrodes during a time period when a stylus is interacting with the touch screen, and disconnect touch electrodes in the interference area from the drive chip through corresponding switch circuits.

Optionally, in some embodiments of the disclosure, the plurality of switch circuits each includes: at least two first switch transistors.

An input terminal of each of the at least two first switch transistors is coupled to the drive chip, and an output terminal of each of the at least two first switch transistors is coupled to a respective one of the touch electrodes.

Optionally, in some embodiments of the disclosure, the plurality of switch circuits each further includes a second switch transistor.

An input terminal of the second switch transistor is coupled to the drive chip, and an output terminal of the second switch transistor is coupled to input terminals of the at least two first switch transistors in the same switch circuit.

Optionally, in some embodiments of the disclosure, the drive chip includes a plurality of processors.

The processors are configured to convert analog signals into digital signals.

The processors are coupled to the plurality of switch circuits.

Optionally, in some embodiments of the disclosure, the processors are coupled to the plurality of switch circuits respectively in one-to-one correspondence.

Optionally, in some embodiments of the disclosure, one of the switch circuits is coupled to at least two of the processors.

Correspondingly, embodiments of the disclosure further provide a touch system, including: the above-mentioned touch device and a stylus matching with the touch device.

Correspondingly, embodiments of the disclosure further provide a control method of the above-mentioned touch system.

The method includes:

determining, by the drive chip, that the touch screen is contacted by an interference object and determining an interference area, according to capacitance values of the touch electrodes during a time period when the stylus is interacting with the touch screen; and disconnecting, by the drive chip, touch electrodes in the interference area from the drive chip through corresponding switch circuits.

Optionally, in some embodiments of the disclosure, the plurality of switch circuits each includes at least two first switch transistors.

The disconnecting, by the drive chip, touch electrodes in the interference area from the drive chip through corresponding switch circuits, includes:

controlling, by the drive chip, first switch transistors corresponding to the touch electrodes in the interference area to be turned off.

Optionally, in some embodiments of the disclosure, the plurality of switch circuits each includes at least two first switch transistors and a second switch transistor.

The disconnecting, by the drive chip, touch electrodes in the interference area from the drive chip through corresponding switch circuits, includes:

when all touch electrodes corresponding to a switch circuit are in the interference area, controlling, by the drive chip, the second switch transistor in the switch circuit to be turned off; and/or when a part of touch electrodes corresponding to a switch circuit are in the interference area, controlling, by the drive chip, the second switch transistor in the switch circuit to be turned on, and controlling first switch transistors corresponding to the touch electrodes in the interference area to be turned off.

Optionally, in some embodiments of the disclosure, the method further includes:

sending, by the drive chip, a handshake signal to the touch electrodes;

feeding back, by the stylus, an excitation signal to the touch electrodes after receiving the handshake signal;

determining, by the drive chip, a contact position of the stylus and the touch screen according to the excitation signal received by the touch electrodes, and obtaining a sliding trajectory of the stylus.

Optionally, in some embodiments of the disclosure, the sending, by the drive chip, the handshake signal to the touch electrodes, includes:

sending, by the drive chip, the handshake signal to the touch electrodes frame by frame.

Optionally, in some embodiments of the disclosure, the feeding back, by the stylus, the excitation signal to the touch electrodes after receiving the handshake signal, includes:

feeding back, by the stylus, the excitation signal to the touch electrodes in at least two consecutive frames after receiving the handshake signal. The stylus feeds back the excitation signal once per frame.

DETAILED DESCRIPTION OF THE EMBODIMENTS

Figure 3:
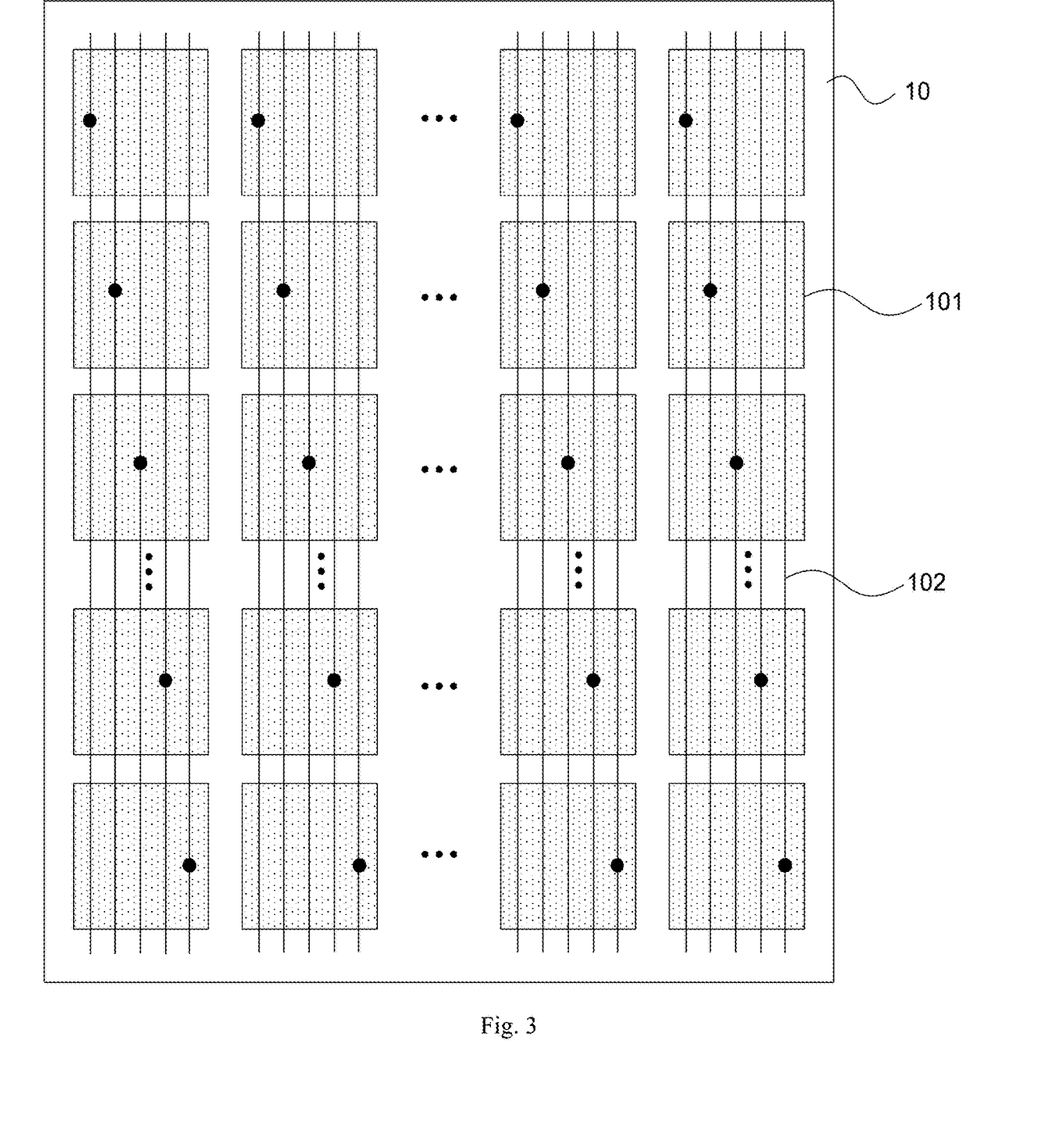
FIG. 3 is a structural schematic diagram of a touch screen in an embodiment of the disclosure.
Figure 4:
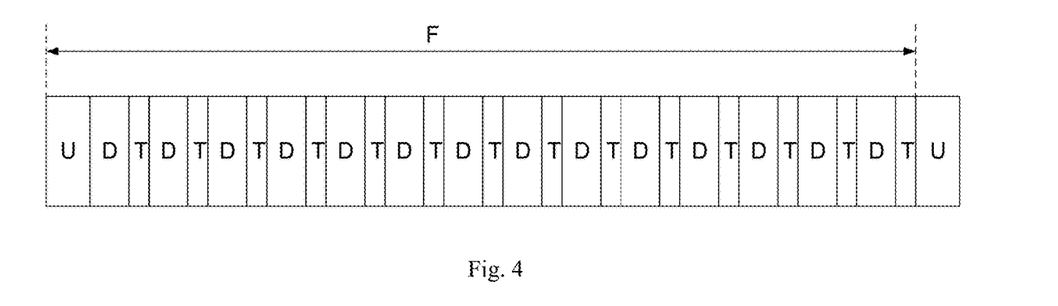
FIG. 4 is a timing diagram of the stylus protocol.

In some embodiments, the touch system realizes the scribing and point reporting functions of the stylus based on the structure of the touch screen shown in FIG. 3 and based on the stylus protocol shown in FIG. 4.

As shown in FIG. 3, a touch screen 10 includes a plurality of touch electrodes 101 and a plurality of touch traveling lines 102. The touch electrodes 101 are coupled to a drive chip through the touch traveling lines 102, and the drive chip may send a handshake signal to the touch electrodes 101 and also receive the excitation signal collected by the touch electrodes 101.

As shown in FIG. 4, one frame of time period F includes: a handshake signal transmission time period U, a display time period D, and a touch detection time period T. The handshake signal transmission time period U is used to transmit the handshake signals W and generally the handshake signal transmission time period U is located at the beginning of one frame of time period F. The display time period D is used to transmit the display signals. The touch detection time period T is used to transmit the touch detection signals. The display time period D is distributed separately from the touch detection time period T, that is, the display signals and the touch detection signals are transmitted at different times. Specifically, the touch detection signals may include a stylus detection signal, a noise detection signal, a finger touch detection signal, and a stylus tilt angle detection signal, etc. In a specific implementation, the number of touch detection time periods T in one frame of time period F can be determined according to the actual needs of the touch screen P. For example, 14 touch detection time periods T may be set in one frame of time period F in FIG. 4. 8 touch detection time periods T are used to transmit the stylus detection signal, 1 touch detection time period T is used to transmit the noise detection signal, 2 touch detection time periods T are used to transmit the finger touch detection signal, and 2 touch detection time periods T are used to transmit the stylus tilt angle detection signal, which can be configured according to the specifications of the actual product and is not limited here.

Figure 5:
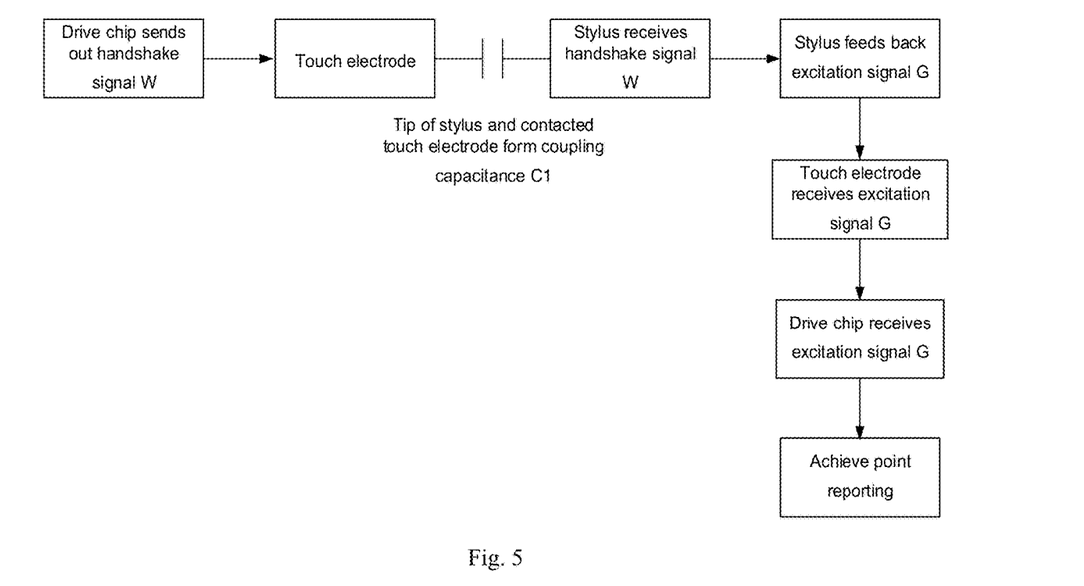
FIG. 5 is a schematic diagram of the point reporting process corresponding to the normal writing state shown in FIG. 1.

FIG. 5 is a point reporting process corresponding to the normal writing state shown in FIG. 1. Specifically, the drive chip sends the handshake signal W to the touch electrodes during the handshake signal transmission period U. When a user holds a stylus with one hand to write on the touch screen, the distance between the stylus and the touch electrode is relatively close and the stylus is in the conductive state, so a coupling capacitance C1 is formed between the tip of the stylus and the touch electrode, and thus the stylus can receive the handshake signal W through the coupling capacitance C1. When the handshake signal W received by the stylus is large enough, it means that the distance between the stylus and the touch screen is relatively close and the interaction state is relatively good, so the stylus feeds back an excitation signal G in the touch detection time period T, the touch electrode near the tip of the stylus receives the excitation signal G, and then the drive chip receives the excitation signal G, thereby achieving the point reporting function. After that, the drive chip can determine the tip position of the stylus according to the received excitation signal G, and the display data can be formed through subsequent data processing to control the touch screen to display the sliding trajectory of the stylus, achieving the smooth writing function.

Figure 2:
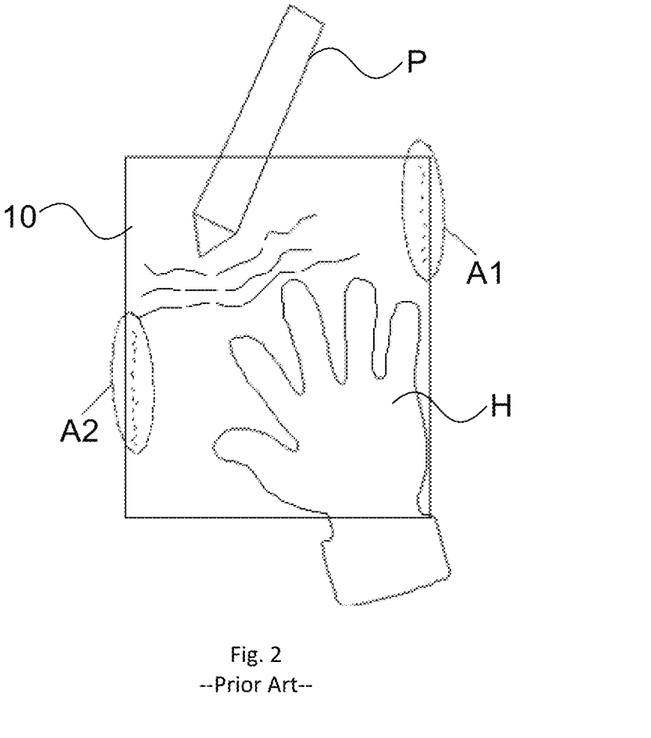
FIG. 2 is a schematic diagram in which the stylus writes on the touch screen in the large-area pressing state.
Figure 6:
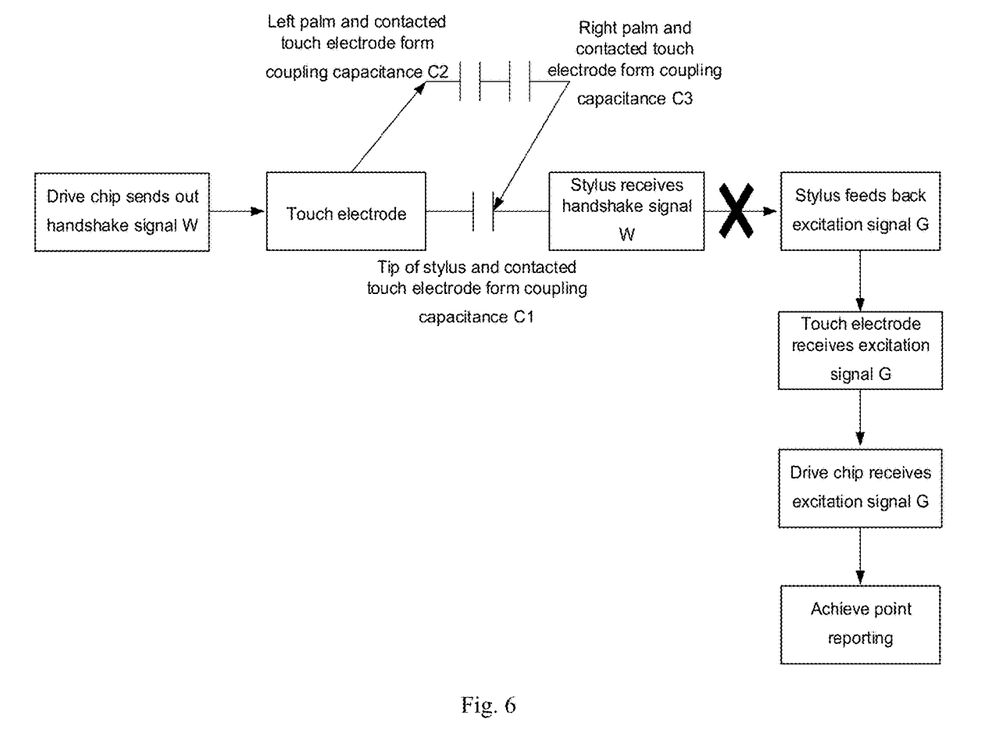
FIG. 6 is a schematic diagram of the point reporting process corresponding to the large-area pressing state shown in FIG. 2.

FIG. 6 is a point reporting process corresponding to the large-area pressing state shown in FIG. 2. As shown in FIG. 2 and FIG. 6, in the large-area pressing state, the user holds the stylus P with one hand to write on the touch screen 10, and the other hand H presses on the touch screen 10. For example, the user grasps the stylus with the palm of the right hand and presses on the touch screen with the palm of the left hand. During the transmission of the handshake signal W to the stylus, the palm of the left hand and the touch electrode generate a coupling capacitance C2, and the palm of the right hand and the stylus form a coupling capacitance C3. Due to the influences of the coupling capacitances C2 and C3, the stylus cannot receive the handshake signal W, or the handshake signal W received by the stylus is relatively weak, so that the requirement of being able to send out the excitation signal G cannot be achieved, the stylus cannot feed back the excitation signal G, the point reporting fails, and thus the broken lines appear.

Figure 7:
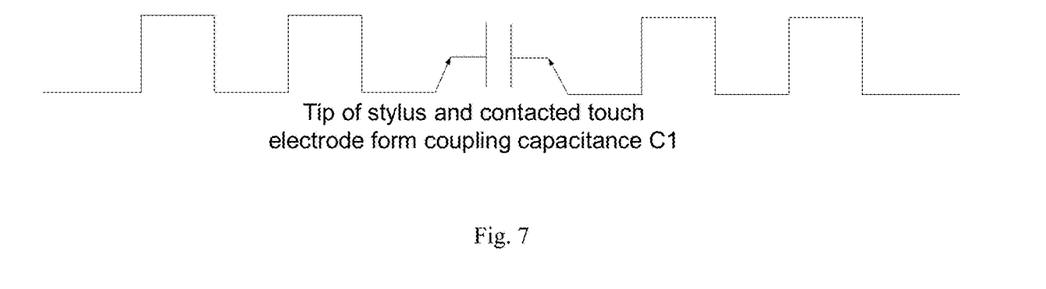
FIG. 7 is a principle schematic diagram of failure to report a point in the large-area pressing state.

In order to show the principle of point reporting failure more clearly, the handshake signal W is a square wave signal as an example in FIG. 7. Since the left hand and the right hand are conductive, the handshake signal W is transmitted from the left hand to the right hand via the touch electrodes when the palm of the left hand presses the touch screen, and the handshake signal W is transmitted to the tip of the stylus when the palm of the right hand grasps the stylus, so that two terminals of the coupling capacitance C1 formed by the tip of the stylus and the touch electrode are added with the same AC signal and thus the signal cancellation phenomenon occurs, so the transmission of the handshake signal W fails.

In the actual application process, it is affected by the contact area between the palm and the touch screen, and the degree of contact between the palm and the touch screen may be different at different times, so the degree of influence of the coupling capacitances C2 and C3 on the transmission of the handshake signal W may change, and thus the on-again-off-again appearance of the lineation of the stylus will occur.

Based on this, in view of the problem that the broken lines are easy to appear in the large-area pressing state, embodiments of the disclosure provide a touch device, a touch system and a control method thereof.

The specific implementations of the touch device, the touch system and the control method thereof provided by embodiments of the disclosure will be illustrated below in detail with reference to the accompanying drawings. The size and shape of each structure in the accompanying drawings do not reflect the true proportion, and are merely for purpose of schematically illustrating the content of the disclosure.

Figure 8:
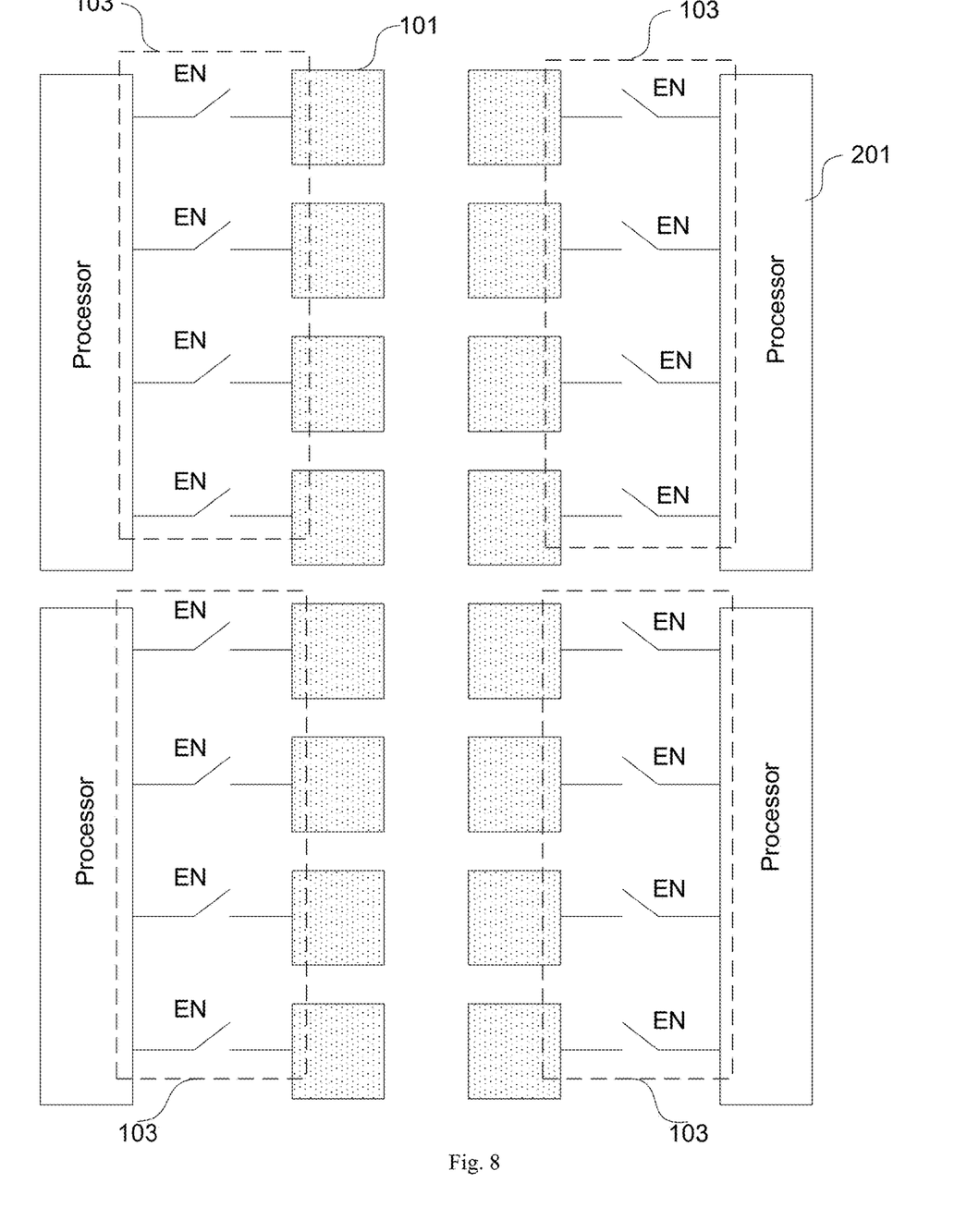
FIG. 8 is a first structural schematic diagram of a touch device provided by an embodiment of the disclosure.

Embodiments of the disclosure provide a touch device, as shown in FIG. 8, which includes:

a touch screen including: a plurality of touch electrodes 101, and a plurality of switch circuits 103 corresponding to the touch electrodes 101 respectively; and a drive chip bound and connected with the touch screen.

The touch electrodes 101 are coupled to the drive chip through the corresponding switch circuits 103.

The drive chip is configured to determine that the touch screen is contacted by an interference object and determine the interference area, according to capacitance values of the touch electrodes 101 during a time period when a stylus is interacting with the touch screen, and disconnect touch electrodes 101 in the interference area from the drive chip through corresponding switch circuits 103.

In the touch device provided by the embodiments of the disclosure, a plurality of switch circuits are provided in the touch screen, and the drive chip determines that the touch screen is contacted by an interference object according to the capacitance values of the touch electrodes during a time period when the stylus is interacting with the touch screen and then disconnects touch electrodes in the interference area from the drive chip through the switch circuits corresponding to the touch electrodes in the interference area, so that the signal transmission between the touch electrodes in the interference area and the drive chip can be disconnected, avoiding the effect on the signal transmission between the touch electrodes and the stylus due to the contact of the interference object with the touch screen, and thus avoiding the problem of broken lines.

In a specific implementation, the above touch screen in the embodiments of the disclosure may also have the display function, so as to display the sliding trajectory of the stylus. Specifically, the above touch screen may include a display panel and a touch module. The touch module may be attached to the light-emitting surface of the display panel, or the touch module may be integrated into the display panel. The specific structure of the touch screen is not limited here.

The above drive chip may be a Touch and Display Driver Integration (TDDI) chip, or the above drive chip may be a non-integrated chip including a touch drive component and a display drive component, which is not limited here.

In a specific implementation, the above stylus may match with the above touch device, the above stylus is a conductor, and the stylus has the function of receiving and sending signals, so the stylus can receive the handshake signal of the drive chip and can feed back the excitation signal.

In a time period during which the stylus is interacting with the touch screen, in order to enable the drive chip to send a handshake signal to each touch electrode smoothly, the drive chip keeps coupling to each touch electrode through a corresponding switch circuit. When an interference object contacts the touch screen, for example, when a user's palm contacts the touch screen, a coupling capacitance is formed between the palm and the touch electrode, and generally the palm has a greater influence on the capacitance value of the touch electrode, so the interference area of the palm can be determined by detecting the capacitance values of the touch electrodes. In some embodiments of the disclosure, the interference object may be understood as any object that can affect the interaction between the stylus and the touch screen by contacting the touch screen. The principles of other interference objects contacting the touch screen are similar to the principle of the palm contacting the touch screen, and the interference area can also be obtained according to the capacitance value of each touch electrode. The drive chip disconnects the touch electrodes in the interference area from the drive chip through corresponding switch circuits, and the touch electrodes in the interference area will not receive the handshake signal, so the contact of the interference object with the touch screen will not affect the signal transmission between the touch electrodes and the stylus, thereby avoiding the phenomenon of broken lines in the sliding trajectory of the stylus. In practical applications, when the drive chip detects that the contact of the interference object with the touch screen ends, the coupling between the touch electrodes in the interference area and the drive chip can be restored.

Specifically, in the above touch device provided by embodiments of the disclosure, as shown in FIG. 8, the switch circuit 103 may include: at least two first switch transistors EN.

The input terminal of the first switch transistor EN is coupled to the drive chip, and the output terminal is coupled to the touch electrode 101.

Referring to FIG. 8, the drive chip is coupled to the touch electrode 101 through the first switch transistor EN, so that the connection state of the touch electrode 101 and the drive chip can be controlled through the corresponding first switch transistor EN. Specifically, the first switch transistor EN can be controlled to be turned on/off by applying a control signal to the gate of the first switch transistor EN.

Taking the structure shown in FIG. 8 as an example, in the time period during which the stylus is interacting with the touch screen, the drive chip detects that an interference object contacts the touch screen, so the drive chip controls first switch transistors EN corresponding to touch electrodes 101 in the interference area to be turned off, thereby disconnecting the touch electrodes 101 in the interference area from the drive chip.

Figure 9:
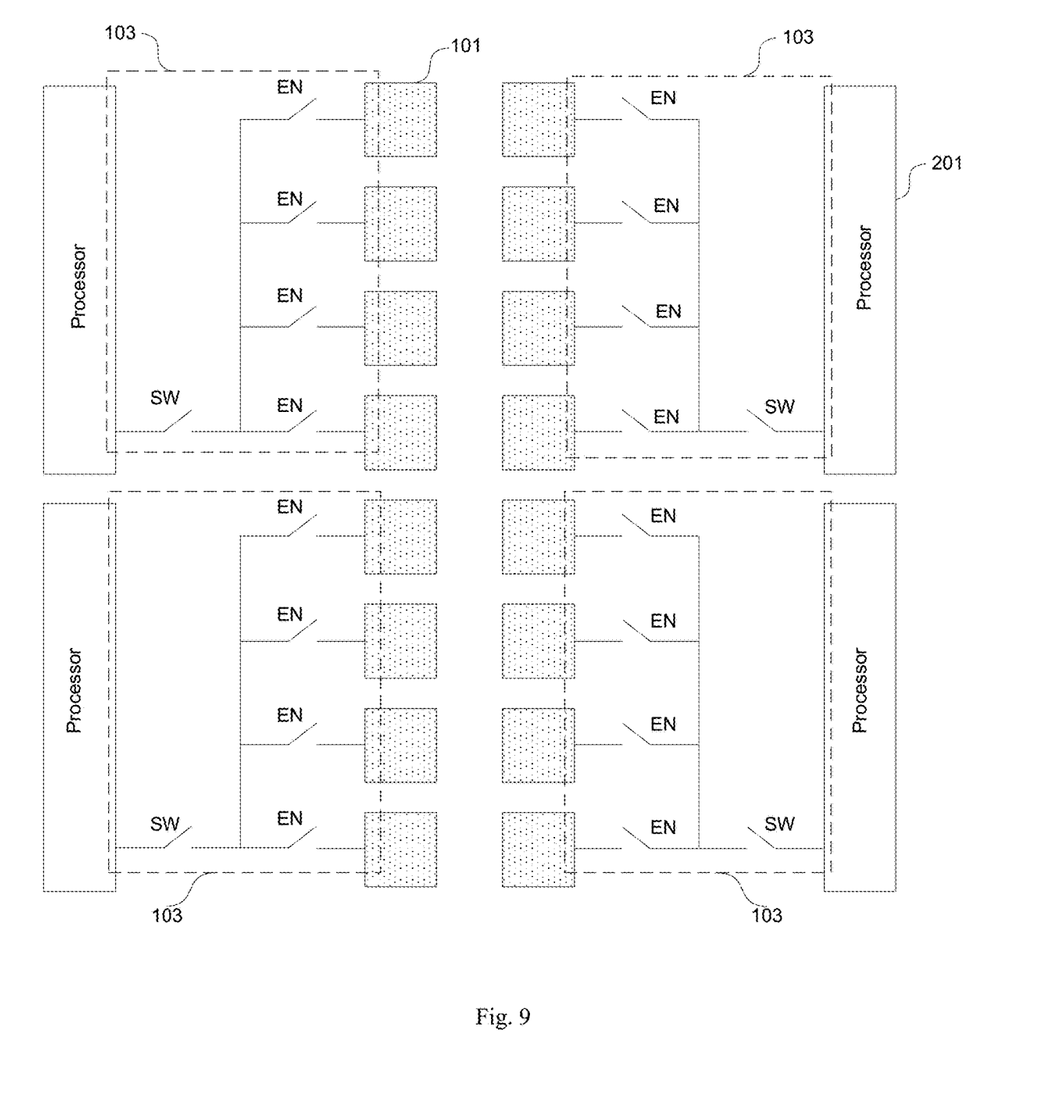
FIG. 9 is a second structural schematic diagram of a touch device provided by an embodiment of the disclosure.

Further, in the above touch device provided by embodiments of the disclosure, as shown in FIG. 9, the above switch circuit 103 may further include: a second switch transistor SW.

The input terminal of the second switch transistor SW is coupled to the drive chip, and the output terminal is coupled to the input terminals of first switch transistors EN in the same switch circuit 103.

In other words, by arranging the second switching transistor SW to be coupled to the first switching transistors EN in the same switching circuit 103, the wiring between the switching circuit 103 and the drive chip can be reduced, thereby saving the wiring space and wiring cost.

In a specific implementation, the second switching transistor SW can be controlled to be turned on/off by applying a control signal to the gate of the second switching transistor SW. By controlling the first switch transistors EN and the second switch transistor to be turned on/off, the connection state of each touch electrode and the drive chip can be controlled. Specifically, if all the touch electrodes 101 corresponding to a switch circuit 103 are in the interference area, then the drive chip controls the second switch transistor SW in the switch circuit 103 to be turned off, that is, controls all the touch electrodes 101 corresponding to the switch circuit 103 to be disconnected from the drive chip. If a part of the touch electrodes 101 corresponding to a switch circuit 103 are in the interference area, then the drive chip controls the second switch transistor SW in the switch circuit 103 to be turned on and controls first switch transistors EN corresponding to the part of touch electrodes 101 in the interference area to be turned off, thereby disconnecting the touch electrodes 101 in the interference area from the drive chip, and ensuring that the touch electrodes 101 outside the interference area keep the state of coupling to the drive chip.

Specifically, in the above touch device provided by embodiments of the disclosure, as shown in FIG. 8, the above drive chip includes: a plurality of processors 201.

The processors 201 are configured to convert analog signals into digital signals.

The processors 201 are coupled to the switch circuits 103.

The above processors 201 may convert the received analog signals into digital signals, so that the data processor in the display device can form the corresponding display data according to the digital signals. In a specific implementation, the processors 201 are located in the drive chip, and the drive chip is coupled to the switch circuits 103 through a plurality of processors 201 respectively.

More specifically, in the above touch device provided by embodiments of the disclosure, as shown in FIGS. 8 and 9, a plurality of processors 201 are respectively coupled to the switch circuits 103 in one-to-one correspondence, so that the connection state of a processor 201 with the corresponding touch electrodes 101 can be controlled through a corresponding switch circuit 103.

Figure 10:
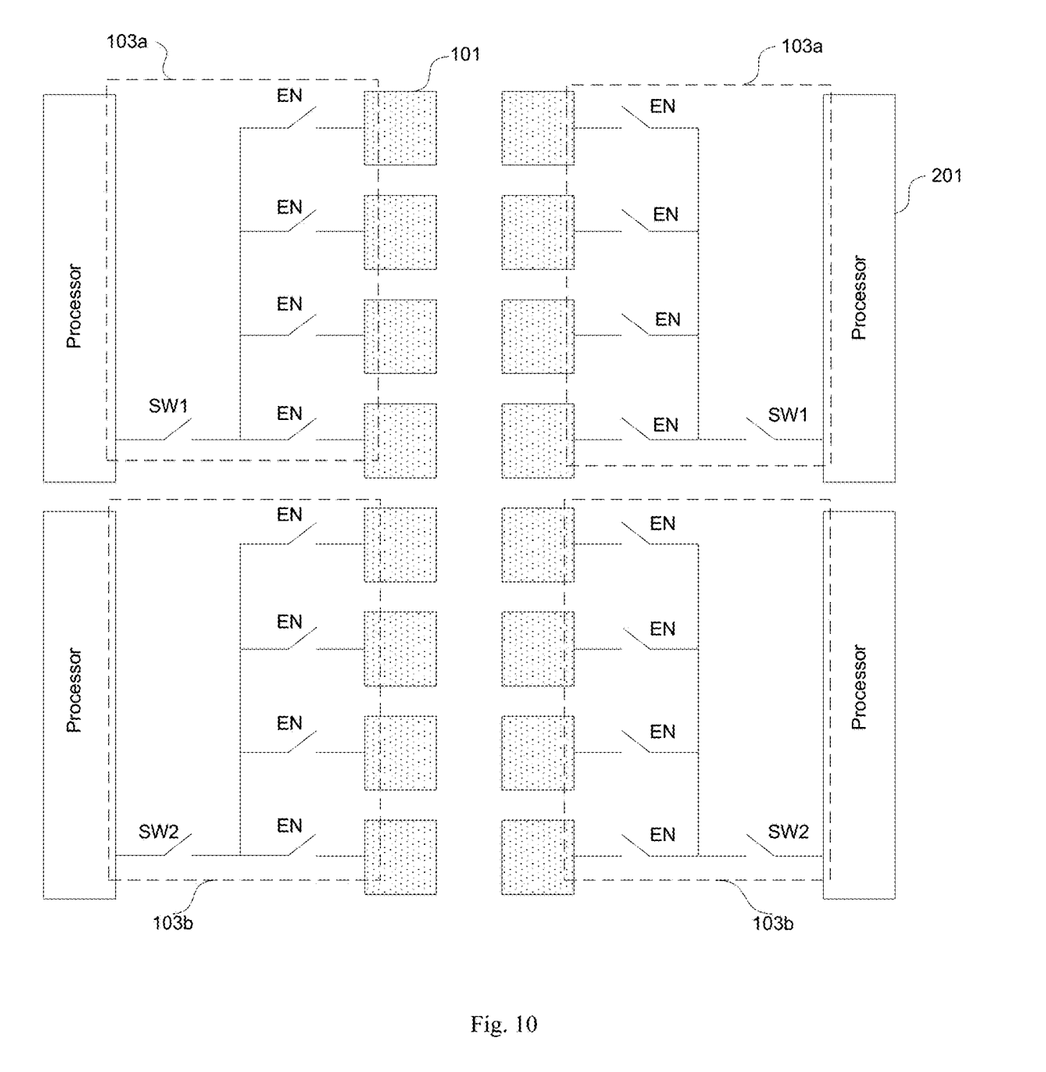
FIG. 10 is a third structural schematic diagram of a touch device provided by an embodiment of the disclosure.

More specifically, in the above touch device provided by embodiments of the disclosure, as shown in FIG. 10, one switch circuit 103 is coupled to at least two processors 201. As shown in FIG. 10, two upper processors 201 are coupled to the corresponding touch electrodes 101 through the same switch circuit 103a. Two lower processors 201 are coupled to the corresponding touch electrodes 101 through the same switch circuit 103b. One second switch transistor SW1 can be coupled to respective first switch transistors EN in the switch circuit 103a, and one second switch transistor SW2 can be coupled to respective first switch transistors EN in the switch circuit 103b. In FIG. 10, one switch circuit 103 is coupled to two processors 201 as an example for illustration. In a specific implementation, one switch circuit 103 may also be coupled to more processors 201, which is not limited here.

Based on the same inventive concept, embodiments of the disclosure further provide a touch system including: the above touch device, and a stylus matching with the touch device. Since the principle solving the problem of the touch system is similar to that of the above touch device, the implementations of the touch system can refer to the implementations of the above touch device, and the repeated description thereof will be omitted here.

Based on the same inventive concept, embodiments of the disclosure further provide a control method of the above touch system. Since the principle solving the problem of the control method is similar to that of the above touch system, the implementations of the control method can refer to the implementations of the above touch system, and the repeated description thereof will be omitted here.

Figure 11:
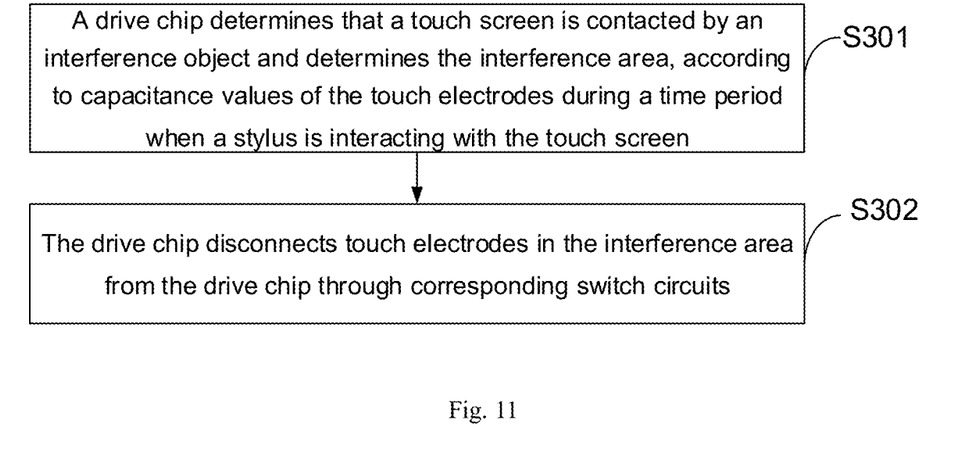
FIG. 11 is a first flowchart of a control method of the touch device provided by an embodiment of the disclosure.

The control method of the above touch system provided by some embodiments of the disclosure, as shown in FIG. 11, includes the following steps.

S301: a drive chip determines that the touch screen is contacted by an interference object and determines the interference area according to capacitance values of the touch electrodes during a time period when the stylus is interacting with the touch screen.

S302: the drive chip disconnects the touch electrodes in the interference area from the drive chip through corresponding switch circuits.

In the above control method of the touch system provided by the embodiments of the disclosure, the drive chip determines that the touch screen is contacted by the interference object according to the capacitance values of the touch electrodes during a time period when the stylus is interacting with the touch screen and then disconnects the touch electrodes in the interference area from the drive chip through the switch circuits, so that the signal transmission between the touch electrodes in the interference area and the drive chip can be disconnected, avoiding the effect on the signal transmission between the touch electrodes and the stylus due to the contact of the interference object with the touch screen, and thus avoiding the problem of broken lines.

In a time period during which the stylus is interacting with the touch screen, in order to enable the drive chip to send a handshake signal to each touch electrode smoothly, the drive chip keeps coupling to each touch electrode through the switch circuit. When an interference object contacts the touch screen, for example, when a user's palm contacts the touch screen, a coupling capacitance(s) is/are formed between the palm and the touch electrode(s), and generally the palm has a greater influence on the capacitance value(s) of the touch electrode(s), so the interference area of the palm can be determined by detecting the capacitance values of the touch electrodes. The drive chip disconnects the touch electrodes in the interference area from the drive chip through corresponding switch circuits, and the touch electrodes in the interference area will not receive the handshake signal, so the contact of the interference object with the touch screen will not affect the signal transmission between the touch electrodes and the stylus, thereby avoiding the phenomenon of broken lines in the sliding trajectory of the stylus. In practical applications, when the drive chip detects that the contact of the interference object with the touch screen ends, the coupling between the touch electrodes in the interference area and the drive chip can be restored.

Specifically, in the above control method provided by the embodiments of the disclosure, as shown in FIG. 8, the switch circuit 103 includes at least two first switch transistors EN.

The above step S302 may include:

the drive chip controls the first switch transistors corresponding to the touch electrodes in the interference area to be turned off, so that the touch electrodes in the interference area can be disconnected from the drive chip.

Referring to FIG. 8, the drive chip is coupled to the touch electrode 101 through the first switch transistor EN, so that the connection state of the touch electrode 101 and the drive chip can be controlled through the corresponding first switch transistor EN. Specifically, the first switch transistor EN can be controlled to be turned on/off by applying a control signal to the gate of the first switch transistor EN.

Specifically, in the above control method provided by the embodiments of the disclosure, as shown in FIG. 9, the switch circuit 103 includes at least two first switch transistors EN and a second switch transistor SW.

In a specific implementation, the second switching transistor SW can be controlled to be turned on/off by applying a control signal to the gate of the second switching transistor SW. By controlling the first switch transistors EN and the second switch transistor to be turned on/off, the connection state of each touch electrode and the drive chip can be controlled.

The above step S302 may include:

also referring to FIG. 9, if all the touch electrodes 101 corresponding to a switch circuit 103 are in the interference area, then the drive chip controls the second switch transistor SW in the switch circuit 103 to be turned off, so that all the touch electrodes 101 corresponding to the switch circuit 103 are disconnected from the drive chip; and/or also referring to FIG. 9, if a part of the touch electrodes 101 corresponding to a switch circuit 103 are in the interference area, then the drive chip controls the second switch transistor SW in the switch circuit 103 to be turned on and controls first switch transistors EN corresponding to the part of the touch electrodes 101 in the interference area to be turned off, so that the part of touch electrodes 101 in the interference area can be disconnected from the drive chip while the other part of touch electrodes 101 outside the interference area can still be coupled to the drive chip, ensuring that the stylus can interact with the touch screen smoothly.

Figure 12:
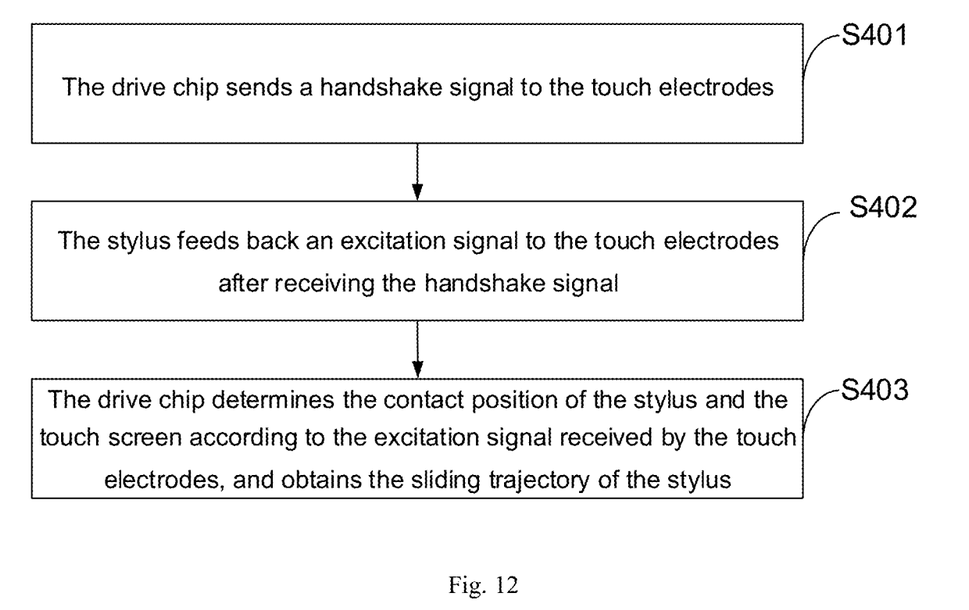
FIG. 12 is a second flowchart of a control method of the touch device provided by an embodiment of the disclosure.

In a specific implementation, the above control method provided by the embodiments of the disclosure, as shown in FIG. 12, may further include the following steps.

S401: the drive chip sends a handshake signal to the touch electrodes.

S402: the stylus feeds back an excitation signal to the touch electrodes after receiving the handshake signal.

S403: the drive chip determines the contact position of the stylus and the touch screen according to the excitation signal received by the touch electrodes, and obtains the sliding trajectory of the stylus.

Specifically, in the above control method provided by the embodiments of the disclosure, the above step S401 may include:

the drive chip sends the handshake signal to the touch electrodes frame by frame. Specifically, the drive chip may send the handshake signal W to the touch electrodes during the handshake signal transmission time period U of each frame.

In other words, the drive chip may send the handshake signal to the touch electrodes continuously so as to monitor whether the stylus touches the touch screen at any time. When the stylus cannot receive the handshake signal, it means that the stylus is far away from the touch screen, and it is possible to make the stylus enter the sleep state to save the power consumption of the stylus.

Specifically, in the above step S402, when the stylus is holden to write on the touch screen, the distance between the stylus and the touch electrode is relatively close and the stylus is in the conductive state, so a coupling capacitance C1 is formed between the tip of the stylus and the touch electrode, and thus the stylus can receive the handshake signal W through the coupling capacitance C1. When the handshake signal W received by the stylus is large enough, it means that the distance between the stylus and the touch screen is relatively close and the interaction state is relatively good, so the stylus feeds back an excitation signal G in the touch detection time period T, the touch electrode near the tip of the stylus receives the excitation signal G, and then the drive chip receives the excitation signal G, thereby achieving the point reporting function.

In the above step S403, the touch electrode closer to the tip of the stylus receives the excitation signal with greater intensity, so the drive chip can determine the contact position of the stylus and the touch screen according to the excitation signal received by the touch electrodes, and obtains the sliding trajectory of the stylus through the subsequent data processing. When the touch screen has the display function, the display data can also be formed to control the touch screen to display the sliding trajectory of the stylus, achieving the smooth writing function.

Figure 13:
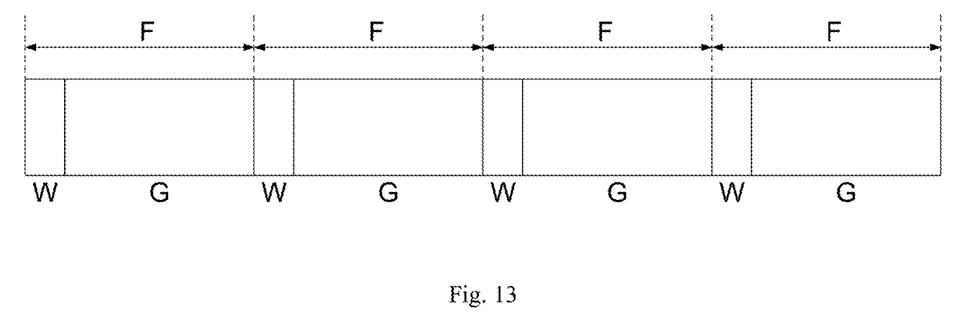
FIG. 13 is a timing diagram of the stylus in the normal writing state in the case shown in FIG. 1.

FIG. 13 is a timing diagram of the stylus in the normal writing state in the case shown in FIG. 1. As shown in FIG. 13, the drive chip sends the handshake signal W during the handshake signal transmission time period U in each frame of time period F, and the stylus feeds back the excitation signal G after receiving the handshake signal W, thereby completing the smooth writing function.

Figure 14:
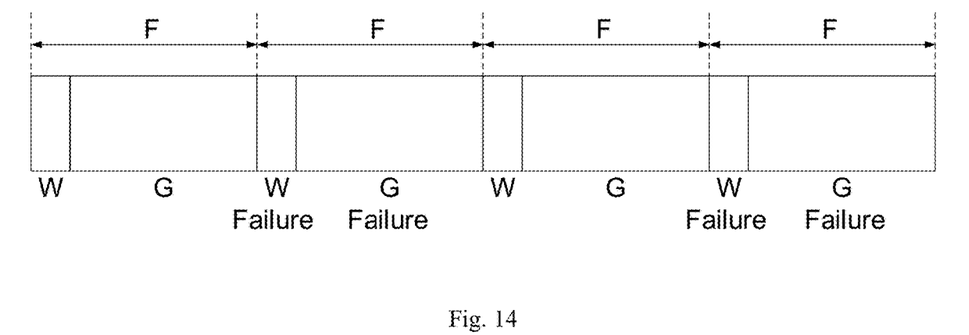
FIG. 14 is a timing diagram in the large-area pressing state in the case shown in FIG. 2.

FIG. 14 is a timing diagram in the large-area pressing state in the case shown in FIG. 2. As shown in FIG. 14, in the second frame of time period F and the fourth frame of time period F, since the stylus receives no handshake signal W, the stylus will not send out the feedback signal G, which causes the phenomenon of broken lines in the two frames of time periods F.

In order to further improve this problem, in the above control method provided by the embodiments of the disclosure, the above step S402 may include that:

the stylus feeds back the excitation signal to the touch electrodes in at least two consecutive frames after receiving the handshake signal, and the stylus feeds back the excitation signal once per frame.

Figure 15:
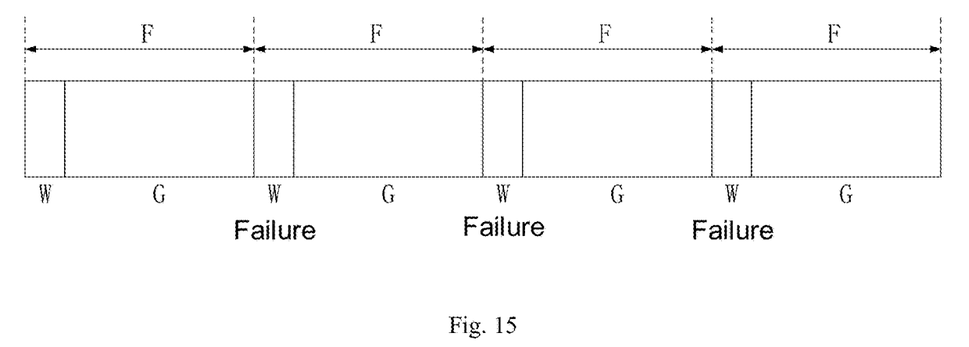
FIG. 15 is a timing diagram corresponding to the control method in an embodiment of the disclosure.

FIG. 15 is a timing diagram corresponding to the control method in embodiments of the disclosure. As shown in FIG. 15, the stylus receives the handshaking signal W in the first frame of time period F. Even if the stylus fails to receive the handshake signals W in the following three frames of time periods F, the stylus feeds back the excitation signal G in four consecutive frames of time periods F. In FIG. 15, the stylus feeds back the excitation signal G in at least four consecutive frames as an example. In a specific implementation, the stylus may feed back the excitation signal in at least two consecutive frames after receiving the handshake signal, which is not limited here.

After the stylus receives the handshake signal, it indicates that the tip of the stylus is closer to the touch screen. Since one frame of time period has the relatively short time and it is generally impossible for the user to control the stylus to move away from the touch screen immediately after it approaches the touch screen, it can be considered that the distance between the stylus and the touch screen is relatively close in a short period of time when the stylus approaches the touch screen. Therefore, it is considered that the stylus is in the writing state in at least two consecutive frames. Even if no handshake signal is received in a next frame of time period, the stylus still sends out the excitation signal to reduce the probability of broken lines in the lineation.

In the touch device, the touch system and the control method thereof provided by the embodiments of the disclosure, a plurality of switch circuits are provided in the touch screen, and the drive chip determines that the touch screen is contacted by an interference object according to the capacitance values of the touch electrodes during a time period when the stylus is interacting with the touch screen and then disconnects the touch electrodes in the interference area from the drive chip through corresponding switch circuits, so that the signal transmission between the touch electrodes in the interference area and the drive chip can be disconnected, avoiding the effect on the signal transmission between the touch electrodes and the stylus due to the contact of the interference object with the touch screen, and thus avoiding the problem of broken lines.

Although the preferred embodiments of the disclosure have been described, those skilled in the art can make additional alterations and modifications to these embodiments once they learn about the basic creative concepts. Thus the attached claims are intended to be interpreted to include the preferred embodiments as well as all the alterations and modifications falling within the scope of the disclosure.

Evidently those skilled in the art can make various modifications and variations to the embodiments of the disclosure without departing from the spirit and scope of the embodiments of the disclosure. Thus the disclosure is also intended to encompass these modifications and variations to the embodiments of the disclosure as long as these modifications and variations come into the scope of the claims of the disclosure and their equivalents.

What is claimed is:

1. A control method of a touch system,
   wherein the touch system comprises: a touch device and a stylus matching with the touch device;
   wherein the touch device comprises:
      a touch screen, comprising: a plurality of touch electrodes, and a plurality of switch circuits corresponding to the plurality of touch electrodes respectively; and
      a drive chip, bound and connected with the touch screen;
   wherein:
      the touch electrodes are coupled to the drive chip through the corresponding switch circuits;
      the drive chip is configured to:
         determine that the touch screen is contacted by an interference object and determine an interference area, according to capacitance values of the touch electrodes during a time period when a stylus is interacting with the touch screen, and
         disconnect touch electrodes in the interference area from the drive chip through corresponding switch circuits;
   wherein the plurality of switch circuits each comprises: at least two first switch transistors and a second switch transistor;
   wherein:
      an input terminal of each of the at least two first switch transistors is coupled to the drive chip;
      an output terminal of each of the at least two first switch transistors is coupled to a respective one of the touch electrodes;
      an input terminal of the second switch transistor is coupled to the drive chip; and
      an output terminal of the second switch transistor is coupled to input terminals of the at least two first switch transistors in the same each switch circuit
   wherein the control method comprises:
      determining, by the drive chip, that the touch screen is contacted by an interference object and determining an interference area, according to capacitance values of the touch electrodes during a time period when the stylus is interacting with the touch screen; and
      disconnecting, by the drive chip, touch electrodes in the interference area from the drive chip through corresponding switch circuits;
   wherein
      said disconnecting, by the drive chip, touch electrodes in the interference area from the drive chip through corresponding switch circuits, comprises:
         when all touch electrodes corresponding to a switch circuit are in the interference area, controlling, by the drive chip, the second switch transistor in the switch circuit to be turned off; and/or
         when a part of touch electrodes corresponding to a switch circuit are in the interference area, controlling, by the drive chip, the second switch transistor in the switch circuit to be turned on, and controlling first switch transistors corresponding to the touch electrodes in the interference area to be turned off.

2. The control method of claim 1, wherein the drive chip comprises:
   a plurality of processors;
   wherein:
      the processors are configured to convert analog signals into digital signals; and
      the processors are coupled to the plurality of switch circuits.

3. The control method of claim 2, wherein the processors are coupled to the plurality of switch circuits respectively in one-to-one correspondence.

4. The control method of claim 2, wherein one of the switch circuits is coupled to at least two of the processors.

5. The control method of claim 1, wherein
   said disconnecting, by the drive chip, touch electrodes in the interference area from the drive chip through corresponding switch circuits, comprises:
   controlling, by the drive chip, first switch transistors corresponding to the touch electrodes in the interference area to be turned off.

6. The control method of claim 1, further comprising:
   sending, by the drive chip, a handshake signal to the plurality of touch electrodes;
   feeding back, by the stylus, an excitation signal to the plurality of touch electrodes after receiving the handshake signal;
   determining, by the drive chip, a contact position of the stylus and the touch screen according to the excitation signal received by the plurality of touch electrodes; and
   obtaining a sliding trajectory of the stylus.

7. The control method of claim 6, wherein said sending, by the drive chip, a handshake signal to the plurality of touch electrodes, comprises:
   sending, by the drive chip, the handshake signal to the touch electrodes frame by frame.

8. The control method of claim 7, wherein said feeding back, by the stylus, an excitation signal to the plurality of touch electrodes after receiving the handshake signal, comprises:

feeding back, by the stylus, the excitation signal to the plurality of touch electrodes in at least two consecutive frames after receiving the handshake signal;
wherein the stylus feeds back the excitation signal once per frame.

* * * * *